United States Patent
Abraham et al.

(10) Patent No.: US 7,170,858 B2
(45) Date of Patent: Jan. 30, 2007

(54) RATE CONTROL FOR MULTIPLEXED VOICE AND DATA IN A WIRELESS COMMUNICATIONS SYSTEM

(75) Inventors: Santosh P. Abraham, Keasbey, NJ (US); Mooi C. Chuah, Marlboro, NJ (US); Cem U. Saraydar, Somerset, NJ (US); Harvey Rubin, Morristown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 988 days.

(21) Appl. No.: 10/156,058

(22) Filed: May 29, 2002

(65) Prior Publication Data
US 2003/0223454 A1  Dec. 4, 2003

(51) Int. Cl.
*H04J 1/16* (2006.01)

(52) U.S. Cl. .................... 370/235; 370/352

(58) Field of Classification Search ........ 370/352–358, 370/389, 417, 413, 428, 493, 494, 495, 235, 370/395.21, 395.4, 395.41, 395.42, 395.43, 370/229, 232, 310.2, 328, 332, 338, 349
See application file for complete search history.

(56) References Cited

U.S. PATENT DOCUMENTS

| | | | | |
|---|---|---|---|---|
| 4,914,650 A | * | 4/1990 | Sriram ..................... | 370/235 |
| 2002/0033416 A1 | * | 3/2002 | Gerszberg et al. .......... | 235/380 |

* cited by examiner

*Primary Examiner*—Brenda Pham

(57) ABSTRACT

Disclosed is a method of controlling communication rates over a link within a communications system. The method includes storing packets associated with voice and data traffic in individual buffers, and determining an instantaneous number of active voice and active data traffic in the individual buffers. Furthermore, a total link bandwidth that the active voice traffic will consume during a frame interval is determined, and an available link bandwidth, for the active data traffic, remaining after the total link bandwidth is calculated. Finally, rate control is applied to fit the active data traffic in the available link bandwidth. Rate control is achieved by allowing a data session to send data at a portion of its full-rate, where the portion is determined as a function of the instantaneous load generated by all sessions carried on the link.

6 Claims, 2 Drawing Sheets

RATE CONTROL FOR MULTIPLEXED VOICE AND DATA IN A WIRELESS COMMUNICATIONS SYSTEM

BACKGROUND OF THE INVENTION

1. Field of the Invention

This invention relates to communications and, more particularly, to a rate control system for a wireless communications system.

2. Description of Related Art

Wireless communications systems include conventional cellular communication systems which comprise a number of cell sites or base stations, geographically distributed to support transmission and receipt of communication signals to and from wireless units that may actually be stationary or fixed. Each cell site handles communications over a particular region called a cell, and the overall coverage area for the cellular communication system is defined by the union of cells for all of the cell sites, where the coverage areas for nearby cell sites overlap to some degree to ensure (if possible) contiguous communications coverage within the outer boundaries of the system's coverage area.

When active, a wireless unit receives signals from at least one base station or cell site over a forward link or downlink and transmits signals to (at least) one cell site or base station over a reverse link or uplink. There are many different schemes for defining wireless channels for a cellular communication system, including TDMA (time-division multiple access), FDMA (frequency-division multiple access), and CDMA (code-division multiple access) schemes. In CDMA communications, different wireless channels are distinguished by different codes or sequences that are used to encode different information streams, which may then be modulated at one or more different carrier frequencies for simultaneous transmission. A receiver can recover a particular stream from a received signal using the appropriate code or sequence to decode the received signal.

Due to the delay-intolerant nature of voice communication, wireless units in conventional cellular systems transmit and receive over dedicated channels between a wireless unit and a base station. Generally, each active wireless unit requires the assignment of a dedicated link on the forward link and a dedicated link on the reverse link. Current wireless communications systems are evolving which provide access to packet data networks, such as the Internet, and support a variety of data services. For example, support for multimedia applications (voice, video and data) is important for any network connected to the Internet. These applications have specific requirements in terms of delay and bandwidth. Traditional data applications are typically bursty and, unlike voice communications, relatively delay tolerant. As such, using dedicated links to transmit data is an inefficient use of network resources. Consequently, resource allocation systems have been devised to make more efficient use of network resources using different quality of service (QoS) classes for the different types of traffic based on the delay-tolerant nature of the traffic.

The Universal Mobile Telecommunications System (UMTS) was designed to offer more wireless link bandwidth and QoS features. FIG. 1 shows a typical UMTS network 10 which can be divided into a radio access network (RAN) 12 and a core network (CN) 14. The RAN 12 comprises the equipment used to support wireless interfaces 16a–b between a wireless unit 18a–b and the UMTS network 10. The RAN 12 includes NodeBs or base stations 20a–c connected over links (Iub links) 21a–c to radio network or base station controllers (RNC) 22a–b. The interface between the base station and the RNC is referred to as the Iub interface or link, and the interface between two RNCs is referred to as the Iur interface although UMTS Release 99 does not require Iur to support routing. Currently, both the Iub and Iur interfaces are based on ATM, and ATM switches are allowed between NodeBs and RNCs in the UMTS architecture.

The core network 14 comprises the network elements that support circuit based communications as well as packet-based communications. In establishing a circuit channel to handle circuit-based communications between the wireless unit 18b and a public switched telephone network (PSTN) 24 or another wireless unit, the base station 20b receives (in the uplink) and transmits (in the downlink), the coded information (circuit voice or circuit switched data) over the wireless interface or link 16b. The RNC 22b is responsible for frame selection, encryption and handling of access network mobility. The RNC 22b forwards the circuit voice and circuit switched data over a network, such as an asynchronous transfer mode (ATM)/Internet Protocol (IP) network to a 3G mobile switching center (MSC) 30. The 3G-MSC 30 is responsible for call processing and macro-mobility on the MSC level. The 3G-MSC 30 establishes the connectivity between the wireless unit 18b and the PSTN 24.

In establishing a packet channel to handle packet-based communications between the wireless unit 18a and a packet data network (PDN) 34, such as the Internet, the base station 20a receives (in the uplink) and transmits (in the downlink), the coded information over the wireless interface or link 16a. In the uplink direction, the RNC 22a reassembles the packets as sent by the wireless unit 18 and forwards them to SGSN 40. In the downlink direction, the RNC 22a receives the packets and segments them into the right size transport frames or blocks to be transferred across the wireless link 16a. The SGSN 40 provides packet data session processing and macromobility support in the UMTS network 10. The SGSN 40 establishes connectivity between the wireless unit 18a and the PDN 34. A GGSN 42 is the gateway to external PDNs. The GGSN 42 acts upon requests from the SGSN 40 for packet data protocol (PDP) session establishment.

On the downlink in a current system, after data is generated and arrives at the RNC 22a from the network, it is mapped to Iub frames before being sent on the Iub-link 21a. For example, once the TTI (Transmission Time Interval) and the Radio Bearer Rate (ranging from 64 Kbps to 384 Kbps for web-browsing interactive service) are given, the mapping can be determined by looking up the corresponding parameters, such as the transport format set shown in Table 1 below. In a current UMTS system, each incoming packet is mapped to the least possible number of frames or TTIs. In this example, after the medium access control (MAC) maps the incoming packet into frames and adds the appropriate headers, the frames are passed onto the dedicated channel framing protocol (DCHFP) layer. The DCHFP layer adds framing protocol headers to the frames to get the Iub frames. The Framing Protocol—Protocol Data Unit (FP PDU) is then passed to the ATM adaptation layer (AAL2) layer described in the standard identified as ITU-T I.363.2. FP PDUs from different terminals are appended with the AAL2 header that identifies the particular wireless unit or user to which the frames belong. These AAL2 layer frames are then packed into ATM cells before being transmitted on the Iub link. The link from RNC to NodeB can have a variety of different bandwidths, such as T1 (1536 Kbps) or E1 (1920 Kbps).

Accordingly, at the RNC, data is received for each UE, and the user data packets go through various layers before actually being transmitted on the Iub link. The incoming data packets are fragmented and appropriate overheads are added before being sent on the Iub link depending on the type of data service being provided. Each packet data service belongs to one of the 4 QoS classes as specified in the 3GPP standards: conversational, interactive, streaming and background. Table 1 shows a typical parameter set for the transport channel for the interactive class. In this example, the transport format set (TFS) contains 5 different transport formats or sizes (TF0–TF4). As shown in Table 1, if transport format TF1 is selected, one 42 byte transport block is sent during the TTI (for example, 20 ms.). If the largest transport format TF4 is selected for sending data over the duration of a TTI, then four (4) 42 byte transport blocks are sent during the TTI, giving the user the peak rate of 64 Kbps. The TFS will be different based on the type of service, and the Radio Bearer Rate and the TTI. In this example, the MAC layer processes the user data according to the specified TFS. The transport format can be referred to as transport format block (TFB) or transport block set size.

TABLE 1

Transport channel parameters for Interactive or background/64 Kbps PS RAB

| RLC | Logical channel type | DTCH |
|---|---|---|
| | RLC mode | AM |
| | Payload sizes, byte | 40 |
| | Max data rate, kbps | 64 |
| | RLC header, byte | 2 |
| MAC | MAC header, byte | 0 |
| | MAC multiplexing | N/A |
| Layer 1 | TrCH type | DCH |
| | TB sizes, bytes | 42 |
| | TFS     TF0, bytes | 0 × 42 |
| |             TF1, bytes | 1 × 42 |
| |             TF2, bytes | 2 × 42 |
| |             TF3, bytes | 3 × 42 |
| |             TF4, bytes | 4 × 42 |
| | TTI, ms | 20 |

Transport Format Set for the Interactive/background service type for the 64 Kbps Radio Bearer.

When data is received by the RNC for a particular wireless unit or user, the MAC layer creates the appropriate TFB and passes it to the next layer. For example, suppose the RLC buffer holds a 1500 byte packet. The MAC would create 9 TF4's (each with size 160 bytes) which would hold 1440 bytes of user data. The remaining 60 bytes would be placed in the smallest TFB that would hold it, namely TF2 (size 80 bytes).

Due to soft handoff in CDMA systems, there is a strict deadline for transmission of frames from the NodeB to the user after the call is established. If a frame arrives at the NodeB after the deadline has passed, the frame is discarded, thus affecting the QoS. In order to provide reasonable bandwidth utilization on the Iub interface or link (defined as the average fraction of time the link is in use), statistical multiplexing of sources is necessary, leading to variable arrival times (jitter) at the NodeB. Due to the statistical multiplexing on the Iub link, there may be temporary periods when the offered traffic (measured as the total offered bit rate across all sources being multiplexed) exceeds the capacity of the Iub link. For example, one potential problem with the mapping of user data to TFBs as described above is that the offered traffic might well exceed the capacity of the Iub link. For example, with overheads, the peak rate of a user is around 82.5 Kbps. For a T1 link (1536 Kbps), the number of users that can be supported at full rate are 1536/82.5=18. If the number of users with non-empty RLC buffers exceeds 18 at any given point in time, then the input rate to the Iub is more than it can handle. Thus excessive frame discards occur at the NodeB, in addition to the inefficient use of the link in terms of link utilization.

SUMMARY OF THE INVENTION

The present invention is a rate control method for a link between a first node, such as an RNC and a second node, such as a NodeB, within a wireless communications system. For example, the rate control method according to an embodiment of the present invention improves utilization of the link while preserving stringent QoS requirements when multiplexing both voice and data traffic on the same physical bandwidth resource. QoS requirements for the described environment are achieved by dynamically (at synchronous or asynchronous intervals) monitoring traffic and, computing and granting a portion of the bandwidth to voice traffic as required, and applying rate control to the data traffic on the remaining bandwidth such that the total traffic can be sustained by the capacity of the link. As a result, if necessary, a data user is set to a lower rate than a predetermined full rate level by restricting the size of the frame to be sent during a transmission interval.

BRIEF DESCRIPTION OF THE DRAWINGS

Other aspects and advantages of the present invention may become apparent upon reading the following detailed description and upon reference to the drawings in which.

DETAILED DESCRIPTION

Illustrative embodiments of the rate control method for a link between a RNC and a NodeB are described with respect to a radio access network of a UMTS system. The rate control method can be used in other wireless communications system architectures. In a radio access network of a UMTS system, a NodeB can be referred to as a base station, and a radio network controller (RNC) can be referred to as a base station controller. The radio access network in a UMTS system comprises at least the NodeBs and the RNCs.

An embodiment of the rate control method according to the present invention will now be discussed in relation to operational elements of the UMTS system. However, as indicated, this is for illustrative purposes only and should not be construed as limiting of the claimed invention. In the following discussion, "the link" refers to Iub link between a given RNC and a given NodeB.

First, the following variables are defined as:
$N_V$ total number of voice sessions/traffic
$N_{Va}$ number of active voice sessions/traffic
$R_V^{POH}$ total bandwidth occupied by each voice session, including overhead
$R_D$ link bandwidth available to data sessions/traffic
$R_{iub}$ total link bandwidth available Using the provided variables, an equation representative of the rate control method according to an embodiment of the present invention may be obtained. In particular, the equation for determining an amount of bandwidth available to data sessions in a radio access network is:

$$R_D = R_{iub} - N_{Va} * R_V^{POH}.$$

The number of active voice sessions $N_{Va}$ represents those voice sessions that are not currently silent. That is, a voice session fluctuates between periods of activity (talk-spurts) and periods of silence; $N_{Va}$ represents only those voice sessions that are in a talk-spurt period. The total bandwidth of the link taken up by the active voice sessions $N_{Va}$ is equal to $N_{Va} * R_V^{POH}$.

According to the present invention, the voice sessions $N_{Va}$ are permitted to consume the bandwidth of the link as activity and overhead require. When the total amount of bandwidth consumed by the active voice sessions $N_{Va}$ is subtracted from the total link bandwidth $R_{iub}$, the total bandwidth available to the data sessions is $R_D$. The information that consumes the link bandwidth $R_D$ receives rate control, whereas the remainder of the total link bandwidth $R_{iub}$ does not. The link bandwidth $R_D$ has rate control applied from one of the conventional rate control algorithms or methods. For example, one such rate control method is to lower a rate the data is communicated over the link in order to facilitate the handling of the total amount of data buffered for communication.

The above described rate control method according to the present invention may be implemented asynchronously or synchronously. Some improvement gain may be lost with the synchronous version, but the CPU consumption with the synchronous version may be more attractive.

Figure 1:
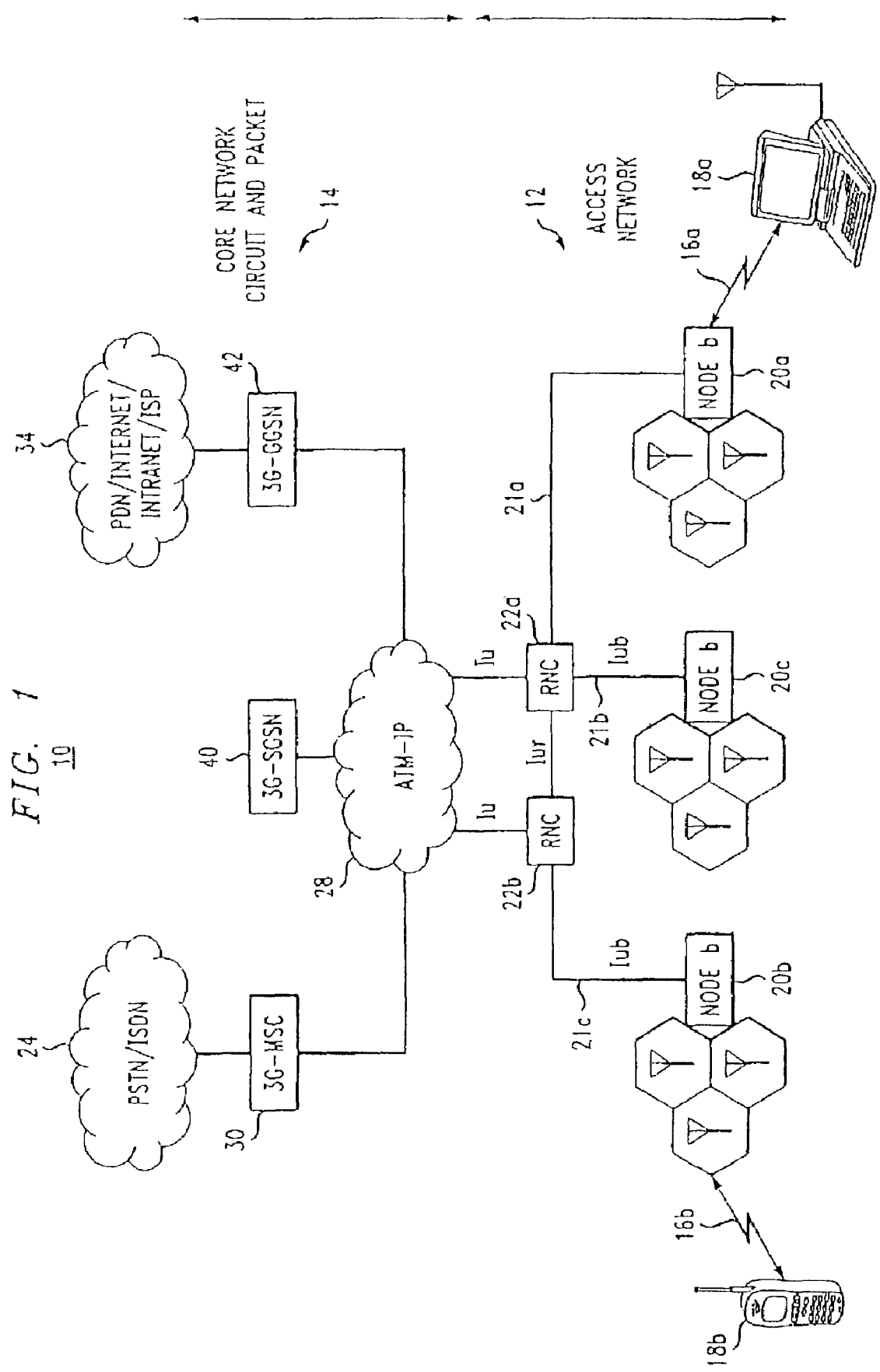
FIG. 1 shows a general block diagram of a UMTS network architecture according to the prior art.
Figure 2:
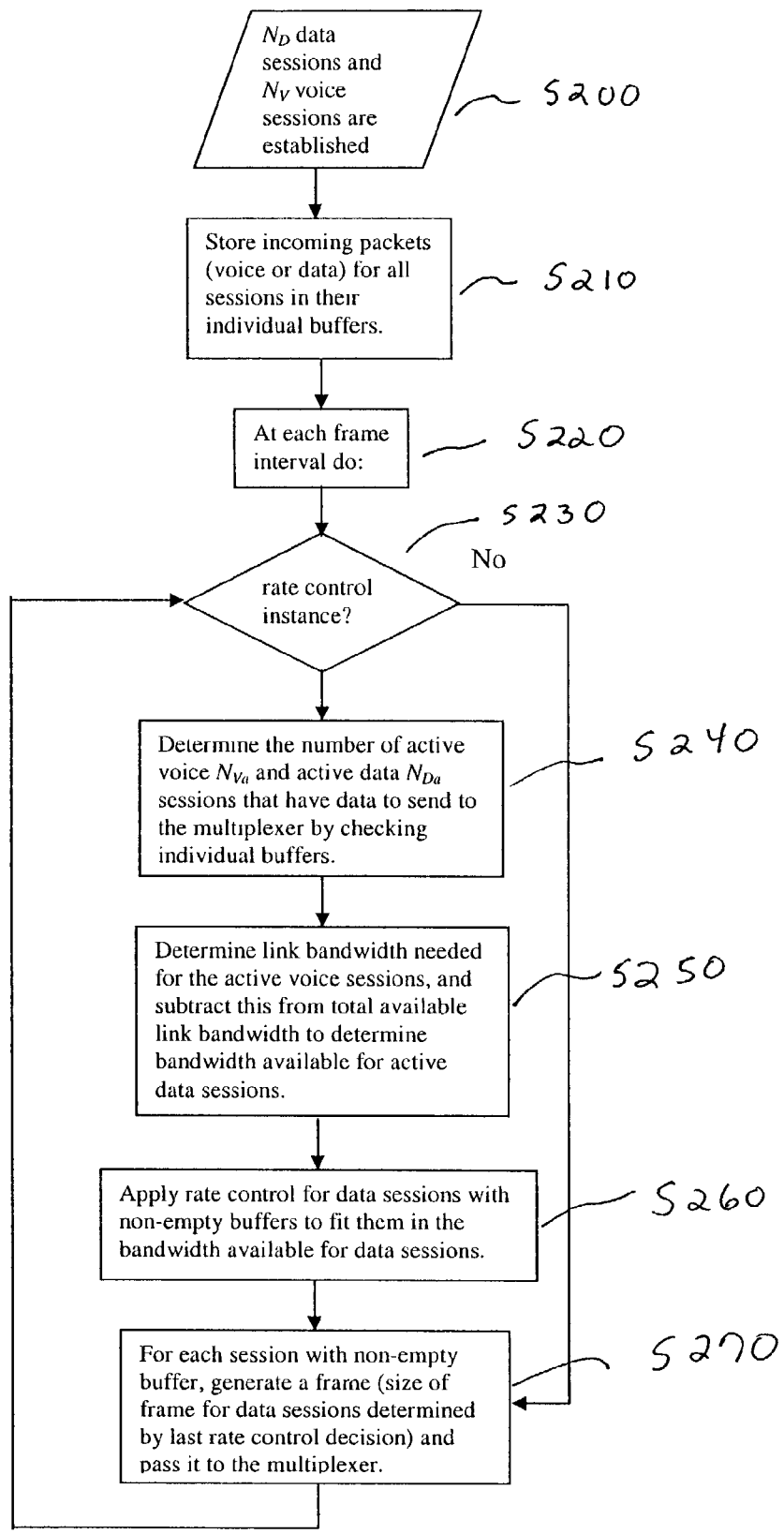
FIG. 2 shows a flow diagram of an embodiment of the rate control method in a UMTS network according to principles of the present invention.

FIG. 2 shows a flow diagram of an embodiment of the rate control method in a UMTS network according to principles of the present invention. Foremost, in the radio access network, both voice $N_V$ and data $N_D$ sessions are established (S200). The packets associated with the sessions are then stored as they arrive in individual buffers of the radio access network (S210).

Between two consecutive frame (transmission) intervals (S220), the rate control system determines if it is time to execute a rate control action (S230). If it is determined that a rate control instance has not yet arrived, the data stored in the buffers are passed on to a multiplexer for communication in the radio access network (S270) in accordance with the rates determined as a result of the most recent rate control action. In this embodiment, the present invention is being implemented every frame interval; the present invention need not be implemented as such. For example, if desired, the rate control algorithm according to the present invention will be performed only after a plurality of frame intervals.

On the other hand, if rate control is required, the instantaneous number of active voice $N_{Va}$ and data $N_{Da}$ sessions that have information to be sent to the multiplexer is determined (S240) by checking if individual buffers are occupied or empty. As an alternative, only the instantaneous number of data $N_{Da}$ sessions is used. That is, past session information associated with recent active voice $N_{Va}$ is used in the place of instantaneous active voice $N_{Va}$ sessions. This is less robust than using both instantaneous active voice $N_{Va}$ and data $N_{Da}$ session information, but may be useful if reduction in computational system requirements is desired. Then, the total link bandwidth that the active voice $N_{Va}$ session(s) will need determined and subtracted from the total link bandwidth $R_{iub}$ in order to obtain the amount of bandwidth available $R_D$ to the active data $N_{Da}$ session(s) (S250). Once the amount of bandwidth available $R_D$ to the active data $N_{Da}$ session(s) is determined, rate control is applied to the active data $N_{Da}$ session(s), only, in order to fit the session(s) in the available bandwidth $R_D$ (S260). Then one frame is generated for each active session and the information in accordance with the active voice $N_{Va}$ and data $N_{Da}$ sessions is passed to the multiplexer (S270).

The rate control method according to the present invention has been described for use in a UMTS system, but the rate control system according to the principles of the present invention can be used with different cellular systems or wireless local area network (LAN) configurations which omit and/or add components and/or use variations or portions of the described system. For example, the rate control system can be implemented in a cdma2000 network to adjust the data rate per user over the link between the base station controller or the mobile switching center (MSC) and a base station depending on the link load (for example, as determined by the rates assigned to other users). In general, the rate control method can control the rates assigned to users over a link between two nodes in a wireless communications system where one of the nodes establishes wireless links with wireless units or users in geographic proximity to the node. For example, the rate control system in a link of a wireless communications system can control the rate for users on the link between a first set of node or nodes (such as Access Point (AP), base station or NodeB) and a second set of nodes or node (such as mobility agent, base station controller or RNC) where a communications link of an end to end communications path (from a wireless unit to a PSTN, a PDN and/or another wireless unit) includes one node of the first set and one node of the second set exclusive of the wireless unit, the PSTN, the PDN and/or the other wireless unit.

It should be understood that the described method can be implemented in processing circuitry at different location(s), such as the wireless unit, the base station, a base station controller, SGSN, GGSN and/or mobile switching center. Additionally, the rate control method can be implemented in application specific integrated circuits, software-driven processing circuitry, firmware, programmable logic devices, hardware, discrete components or arrangements or portions of the above components as would be understood by one of ordinary skill in the art with the benefit of this disclosure.

What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

The invention claimed is:

1. A method of controlling communication rates over a wireless link within a wireless communications system, the method comprising:

determining an amount of instantaneous active wireless voice traffic and an amount of instantaneous active wireless data traffic by examining voice and data packets stored in a plurality of individual buffers every frame interval or plurality of frame intervals;

determining a total wireless link bandwidth that the amount of active wireless voice traffic will consume during a frame interval;

determining, for the amount of active wireless data traffic, an available wireless link bandwidth remaining after the total wireless link bandwidth is determined; and applying rate control only to the amount of active wireless data traffic in order to fit the amount of active wireless data traffic in the available wireless link bandwidth.

2. The method according to claim 1, further comprising determining bandwidth available to data traffic by subtracting a total bandwidth occupied by voice traffic from a total bandwidth available in the wireless link.

3. The method according to claim 1, further comprising storing both voice and data traffic in individual buffers of the wireless communications system.

4. The method according to claim 1, further comprising multiplexing the voice and data traffic to obtain the multiplexed traffic.

5. A computer-readable medium having at least one code segment embodied thereon that causes a processor to perform the method according to claim 1.

6. A method of controlling communication rates over a wireless link within a wireless communications system, the method comprising:

storing packets associated with wireless voice and data traffic in individual buffers;

determining an amount of instantaneous active voice traffic and an amount of instantaneous active data traffic by examining voice and data packets stored in the individual buffers each frame interval or plurality of frame intervals;

determining a total link bandwidth that the amount of active voice traffic will consume during a frame interval;

determining an available link bandwidth, for the amount of active data traffic, remaining after the total link bandwidth is determined; and applying rate control only to the amount of active data traffic in order to fit the amount of active data traffic in the available link bandwidth.

* * * * *